US007007596B2

(12) United States Patent
Telscher

(10) Patent No.: US 7,007,596 B2
(45) Date of Patent: Mar. 7, 2006

(54) BALE PRESS FOR LOOSE MATERIAL

(75) Inventor: Thomas Telscher, Osnabrueck (DE)

(73) Assignee: Paal GmbH, Georgsmariennuette (DE)

( * ) Notice: Subject to any disclaimer, the term of this patent is extended or adjusted under 35 U.S.C. 154(b) by 600 days.

(21) Appl. No.: 09/941,914

(22) Filed: Aug. 29, 2001

(65) Prior Publication Data

US 2002/0062744 A1    May 30, 2002

(30) Foreign Application Priority Data

Sep. 23, 2000  (DE) ............................... 100 47 336

(51) Int. Cl.
*B65B 13/24*    (2006.01)
*B65B 13/26*    (2006.01)
(52) U.S. Cl. ........................... 100/29; 100/32; 100/39; 100/3; 100/35
(58) Field of Classification Search ................... 100/8, 100/29, 31, 32, 19 R, 3, 17, 35; 56/341, 56/343, 432, 445, 453, 460, 462
See application file for complete search history.

(56) References Cited

U.S. PATENT DOCUMENTS

| 2,585,425 A | | 2/1952 | Baskerville | |
|---|---|---|---|---|
| 2,815,234 A | | 12/1957 | Collins | |
| 3,667,377 A | * | 6/1972 | Persson | 100/19 R |
| 4,074,623 A | * | 2/1978 | White | 100/3 |
| 4,092,913 A | * | 6/1978 | Tea | 100/31 |
| 4,129,070 A | * | 12/1978 | Kaffka | 100/17 |
| 5,988,053 A | * | 11/1999 | Leupe et al. | 100/3 |
| 6,026,741 A | * | 2/2000 | Lippens et al. | 100/41 |
| 6,032,575 A | * | 3/2000 | Johnson | 100/11 |

FOREIGN PATENT DOCUMENTS

| DE | 296 04 971 | | 8/1996 |
|---|---|---|---|
| EP | 0 290 180 | | 11/1988 |
| EP | 426905 A1 | * | 5/1991 |
| FR | 685 597 | | 7/1930 |
| GB | 2153293 A | * | 8/1995 |

* cited by examiner

Primary Examiner—Allen Ostrager
Assistant Examiner—Shelley Self
(74) Attorney, Agent, or Firm—Jordan and Hamburg LLP

(57) ABSTRACT

A bale press for lose material, especially for paper with a filling space for material that is to be added loose, a press ram, which can be moved through the filling space into the inlet of a pressing channel or some other baling space, and several knotters for tying material, which are disposed next to one another at the inlet of the pressing channel, in which in each case two opposite strands of a tape loop of the binding material, encircling the bale, are brought together at the front, knotted together and cut after the knot, the associated knotter receiving one of the two strands with a supplying arm through openings in the press ram is equipped for the extreme requirements of industrial high performance presses, especially channel bale presses, in such a manner that the openings in the press ram form channels which are adapted to the movement profile of the supplying arms and, at a front surface of the press ram, are open in outlet slots for the tying material. The driving mechanism of the press ram advisably is stopped during the supplying movement of the supplying arm and the supplying arm is moved forward in its longitudinal direction. The driving mechanisms preferably are pressure medium-actuated driving mechanisms.

50 Claims, 7 Drawing Sheets

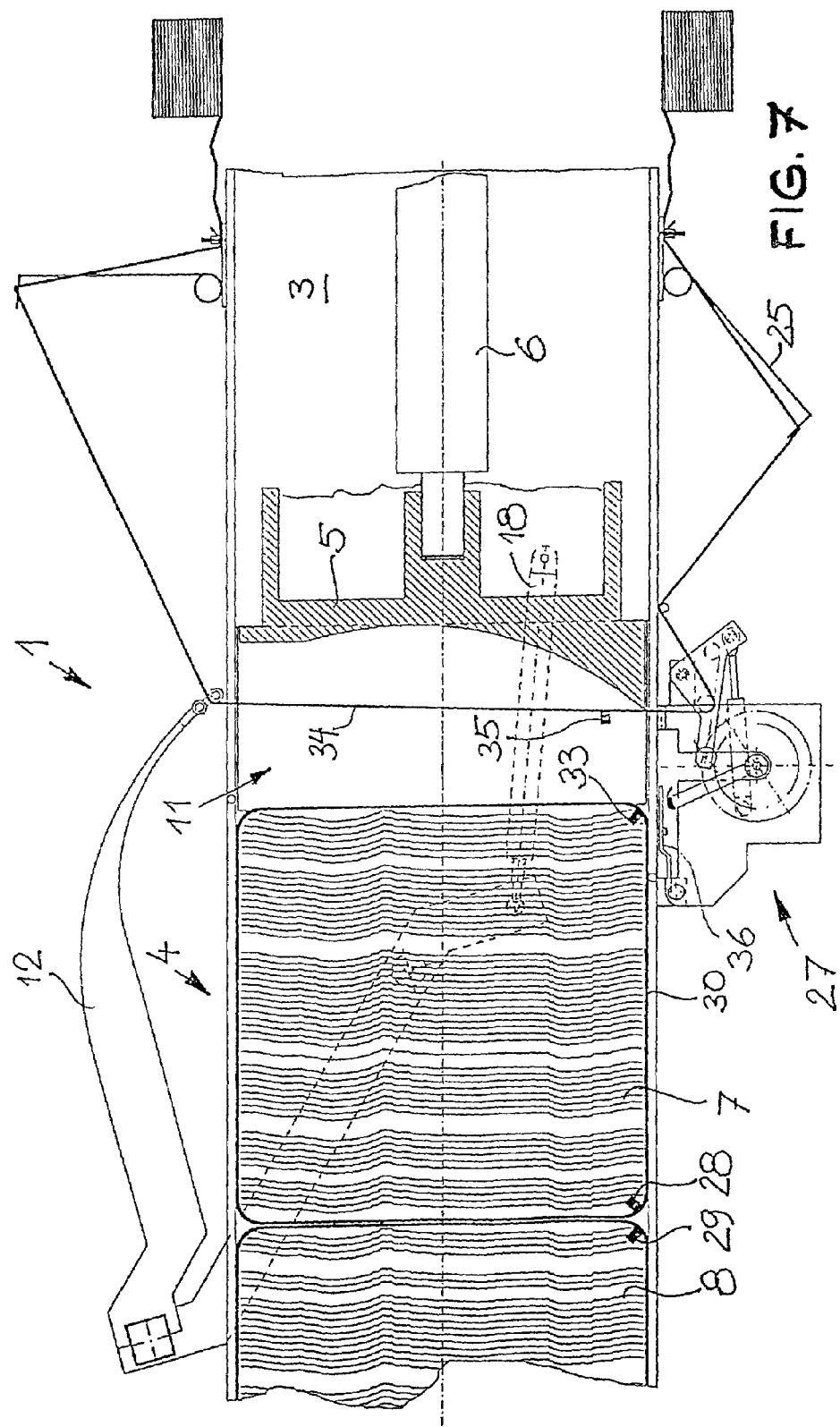

BALE PRESS FOR LOOSE MATERIAL

BACKGROUND OF THE INVENTION

Bale presses have long been known and tested in the field of harvesting machines. For these presses, stalk material, which is to be pressed, is transferred over conveying paths and by conveying means into a filling space and stuffed there with a pivoted press ram into a baling space. The baling space is a provider with tying devices, with the help of which the material pressed is tied up into bales. The course of these processes proceeds with mechanical coupling, the driving mechanism starting out from a central drive shaft.

In addition, there have already been attempts to use systems, which have been tested by harvesting machine, also for stationary presses, such as those for waste paper. This use accommodates, especially, also the tying technique with tape knotters, which was developed for harvesting machines and manufactured on a large scale. In this case, the tape is no longer brought together through the stalk material to the knotter, as is customary with harvesting machines with stalk material that can be pierced well, but must be inserted by the piston, avoiding the material being pressed. This is not a problem in the case of a small and light construction and a piston with wide openings and low working forces, as in the case of harvesting machines.

On the other hand, waste presses for industrial requirements are stationary and work with very high forces and are to be designed for breakdown-free, continuous operation. At the same time, wire ties are generally provided, for which thick wires are uncoiled from rolls and, during the completion of a bale and optionally also at the start of a new bale, are connected to one another by twisting.

However, it has turned out that the wire material interferes with the further processing of the material which has been compressed and, moreover, requires expensive and critical working steps for its elimination. For example, during the comminution or wet processing of waste paper, cut wire residues can stop or even damage the processing machines. Already during the transport and storage of the bales, protruding, twisted and terminally cut wire ends interfere and are hazardous.

SUMMARY OF THE INVENTION

Pursuant to the invention, the knot technique can also be used for large industrial presses with a high output. In this connection, it is very important to construct the openings in the press ram in the form of tailor-made channels which, on the one hand, do not form any dead corners and regions, into which the material being pressed can penetrate and, instead, are "swept" by the supplying arms of the knotters and, on the other hand, with outlet slots at the front for the tying material, enable the die to be retracted after the binding and nevertheless, in contrast to the wide open regions, customary with conventional bale presses working at a low pressure and a low output level, make provisions so that the openings reduce to slots and, with that, are secured as far as possible against penetration of material being pressed and that also the high compression forces are applied with a press ram surface which remains as large as possible.

With that, the knotter technique can also be used with flexible tapes for large presses. It has turned out that these tapes are not in any way inferior in strength, as was previously assumed, to the wire ties. A critical testing in this respect has shown that wire ties, due to the strength of the wire, can absorb high loads. However, the twists represent weaknesses with a much lower load-carrying capacity and represent a need for safety reserves, with which very limited values result. In the case of flexible tying material and a knotting technique, very high strengths can be realized for the tying material as well as at the knot, these results being obtained with little sacrifice of safety. As far as the strength of the girding is concerned, a pressing need for the use of wire girding can no longer be maintained.

A large number of non-metallic fibers of textile or plastic materials, which satisfy the requirements that must be fulfilled here, are available on the market as tying material. Especially for girding waste paper bales, there are even tying materials, which cannot be undone but dissolve when wet, or even tying materials with a fine and short form (i.e., without strong and long fibers, which can therefore be dissolved when wet) for recycling or tying materials on a paper basis, which do not have to be removed in a subsequent recycling process and, instead, can be used as starting material for the recycled product.

Such a bale press can then be operated in the manner already customary with large hydraulic presses with wire ties in a sequential sequence of pressure medium-actuated movements, for which the knotter function is initiated only at the conclusion of a pressing and lifting motion of the press ram, which completes a bale, and the supplying arm passes through the press ram only when the latter is stationary. With that, additional opening spaces in the piston can be avoided, which would otherwise be necessary for mechanically coupled and mutually overlapping motions of the ram and supplying arm of agricultural machines.

For the tape loops, which are to be provided for girding a bale, basically a single knot per tape loop is required, so that the tape loop consists altogether only of a one-piece section of tape. This technique has the advantage that only one knot has to be produced, so that, when the knot is specified with a residual uncertainty with respect to its durability, only one uncertainty place remains. However, this technique had the disadvantage that after the knotting and cutting, the free end of the tying material must be held at the knotter for the subsequent bale and, when forming and pushing in a new bale, the tape must be shifted gradually at the periphery of the bale in accordance with the growth of the latter. This leads to large movement of the tape relative to the bale and also to critical loads.

In accordance with an alternative tying technique, the tying material is pulled off in two strands from two mutually opposite rolls of similar supplies and the knotter produces a knot before and after each cut. One of these knots closes the girding for the finished bale and the other connects the two new open strands into a loop. This loop and the two strands can run along with the bale as it grows without any shifting relative to the bale worth mentioning.

An example of the invention is described in greater details in the following and shown in the accompanying drawings.

BRIEF DESCRIPTION OF THE DRAWINGS

FIGS. 2 to 7 are horizontal sections through the channel press of FIG. 1 for different situations of the tying process.

DETAILED DESCRIPTION OF THE PREFERRED EMBODIMENTS

Figure 1:
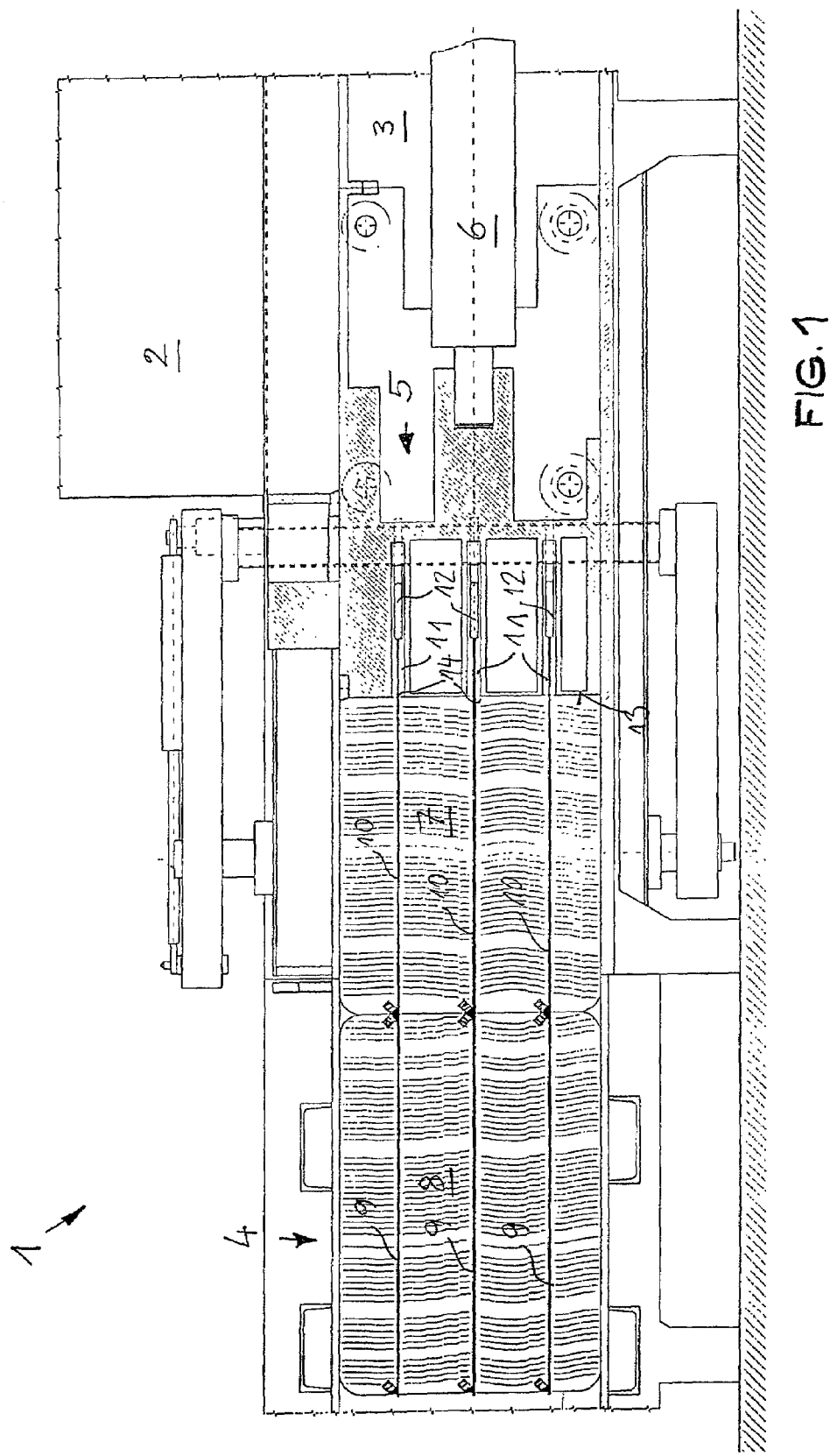
FIG. 1 is a vertical section through a channel track press in accordance with an embodiment of the invention.

The channel bale press, which is labeled 1 as a whole in the drawing, is shown in each case only in a central region with a portion of a filling shaft 2 over a filling space 3 below and the adjoining part of a press channel 4, a press ram 5 with an associated piston 6 of a hydraulic actuator being in the advanced position in the filling space 3 and in the inlet of the press channel 4, where it holds a finished but not yet tied bale 7 under compression, while a previously finished and already tied bale 8 is in the press channel 4 as "abutment" for the bale 7. The construction, described up to now, corresponds to conventional industrial bale presses with hydraulic driving devices and an unwinding technique based on wire windings.

In the present case, however, the bales are held with a tape-shaped flexible tying material, so that the textile bales 8 are fixed with three girdings 9, which lie on top of one another, while the bales are not yet tied but are already bordered on three sides by three open tape loops 10.

For closing these tape loops, in each case, one of two strands of the tying material on either side is passed through the press ram to the other strand. For this purpose, the press ram has channels 11, which extend horizontally here to fit in with the horizontal tying. It is self evident that the alternatively possible vertical tying would lead to vertical channels. The channels are fitted tightly to the space required by three supplying arms 12 and, in a front press ram surface 13, end in slots 14, which offer the smallest possible width for the entry of material, which is being compressed, into the press ram 5.

As is evident from the horizontal sections of FIGS. 2 to 7, the depth of the respective channel is also adapted to the movement profile of the supplying arm 12, in order to avoid "dead corners", in which compressed material can otherwise easily be deposited and consolidated at high loads and during continuous operation and, with time, easily lead to operational malfunctions, which are also difficult to deal with. The channel 11 accordingly is determined by the supplying arm 12, which moves back and forth through the channel 11, carrying out a circular motion about an axis 15. At the same time, penetrating material, such as leaf-shaped paper, is pushed out to the one side or the other. In this respect, the channel 11 still has a terminal expansion 16 relative to the circular contour, in order to facilitate ejection of the pressed material from this region.

The supplying arm 12 has a sickle shape, with which it can be moved largely in the longitudinal direction through the channel 11. It is actuated over a two-arm lever 17 by a hydraulic pressure medium-driving mechanism 18 outside of the channel 11.

The tape is supplied to the press channel 4 from two sides and, moreover, in each case from one of two rolls 20, 21 over one of two adjustable friction guides 22, 23 as yarn brakes for maintaining a yarn tension by friction, which then run together over elastic guides 24, 25 and suitable deflections on the one hand through a guide 26 of the supplying arm 12 and, on the other hand, through a knotter 27 about the new bale 7 up to a knot 28 to form a loop. An adjacent knot 29 at the already finished bale 8, in conjunction with the rolls 20 and 21, which are present in duplicate as a supply of tying material, shows that two knots per cut, one on each side, must be produced, in order to ensure that the tape can be supplied easily on both sides.

Figure 2:
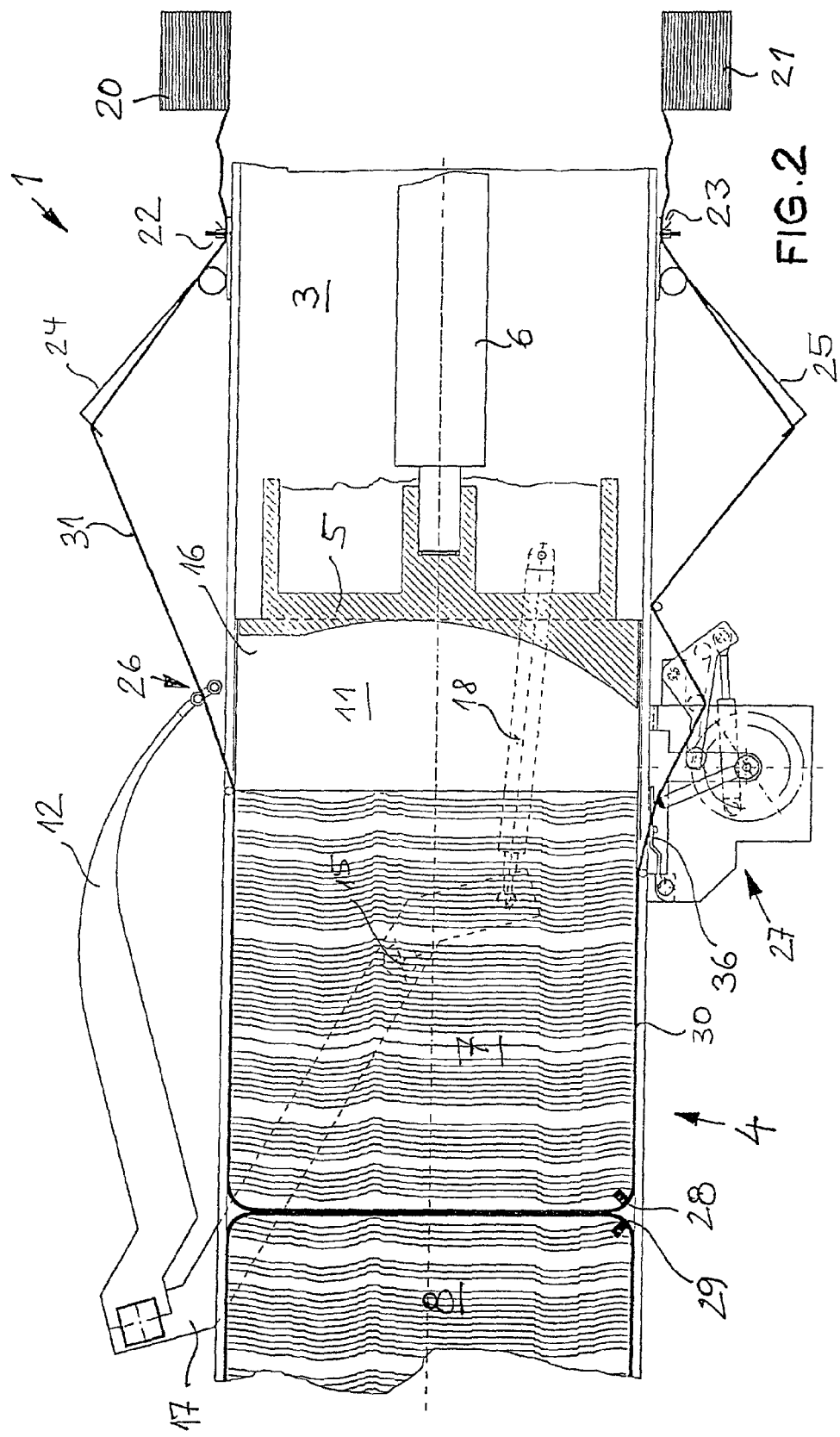

The idle position of the knotter 27 and the supplying arm 12, shown in FIG. 2, normally is maintained during several compressing lifts of the press ram 5 which, with every lift of the die, adds to a partial bale until a complete bale having a specified minimum length is obtained. At the same time, the tape loop 30, closed at the knot 28, moves according to the completion of the bale 7 as far as the starting position for knotting, which is shown.

Figure 3:
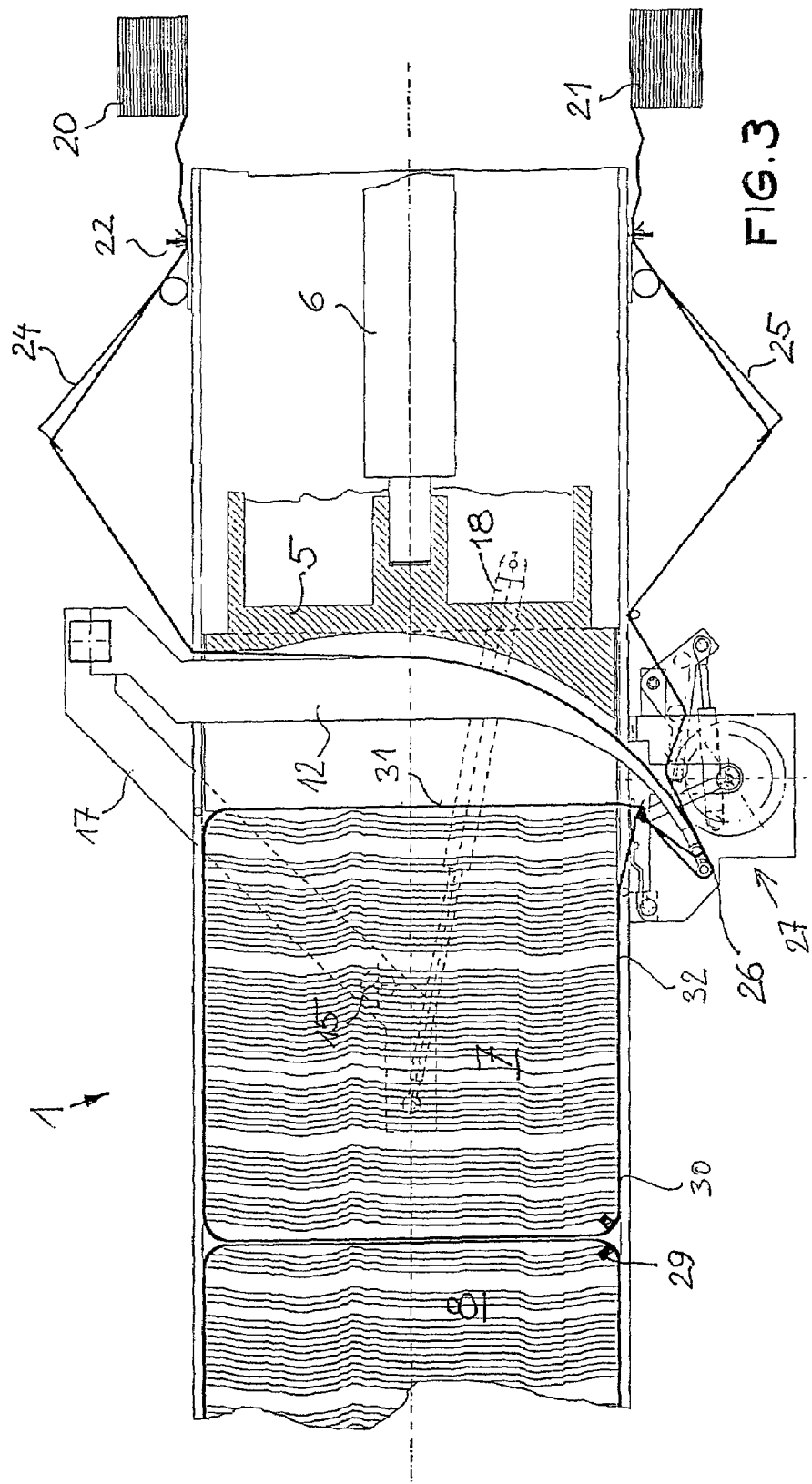

FIG. 3 then shows how the supplying arm 12 with a strand 31 of the tape loop 30, which lies on the outlet side of the supplying arm 12, is swivelled through the piston 5 and, at the same time, has brought together this strand 31 in the region of the knotter 27 with an opposite strand 32 of the tape loop 30. With a rotating and pulling-through motion of the knotter, the loop 30 is closed in the form of a knot 33 and severed from the supply rolls 20 and 21 behind the knot, the ends of the tying material being held together and also knotted (FIG. 5), before the supplying arm 12 returns to its starting position (FIG. 7). The new loop 34, which is held by the new knot 35, is held tightly by the elastic guides 24 and 25 as the supplying arm 12 is retracted.

The structure of the knotter and the knotting process do not have to be discussed completely in detail, since a basic technique is involved here, which has been known and tested in different variations for a long time, especially in the area of harvesting machines. In harvesting machines, there is a central continuous driving mechanism, which moves the participating functioning elements in tight, rigid coupling with one another. It is essential for the actuation of different driving mechanisms, for which provisions are made here, that it is possible to achieve as reliable a driving mechanism as possible even at high press pressures and for material, the compressing properties of which are critical, it being possible to coordinate the starting times and duration of the different courses of motion separately.

Figure 4:
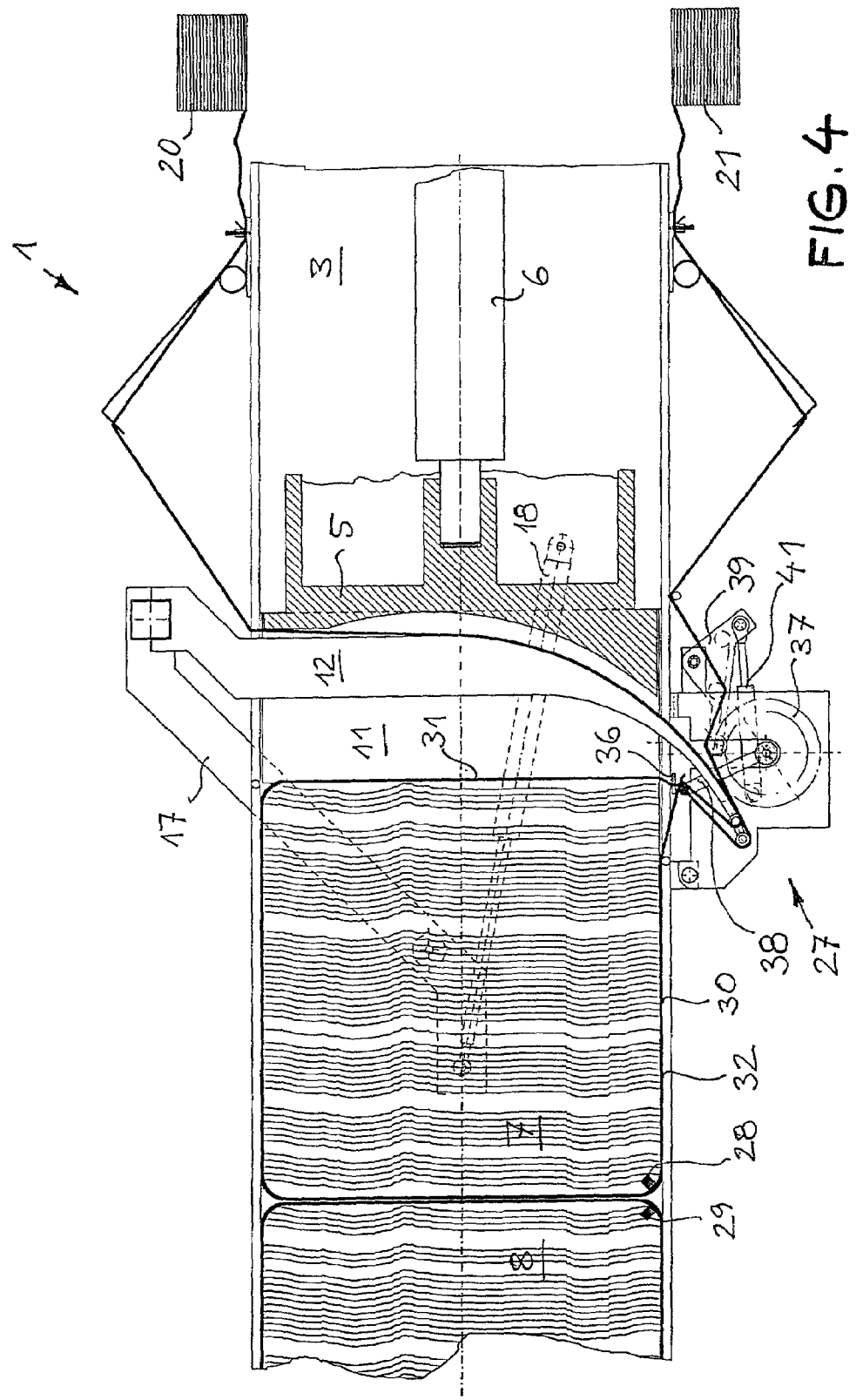
Figure 5:
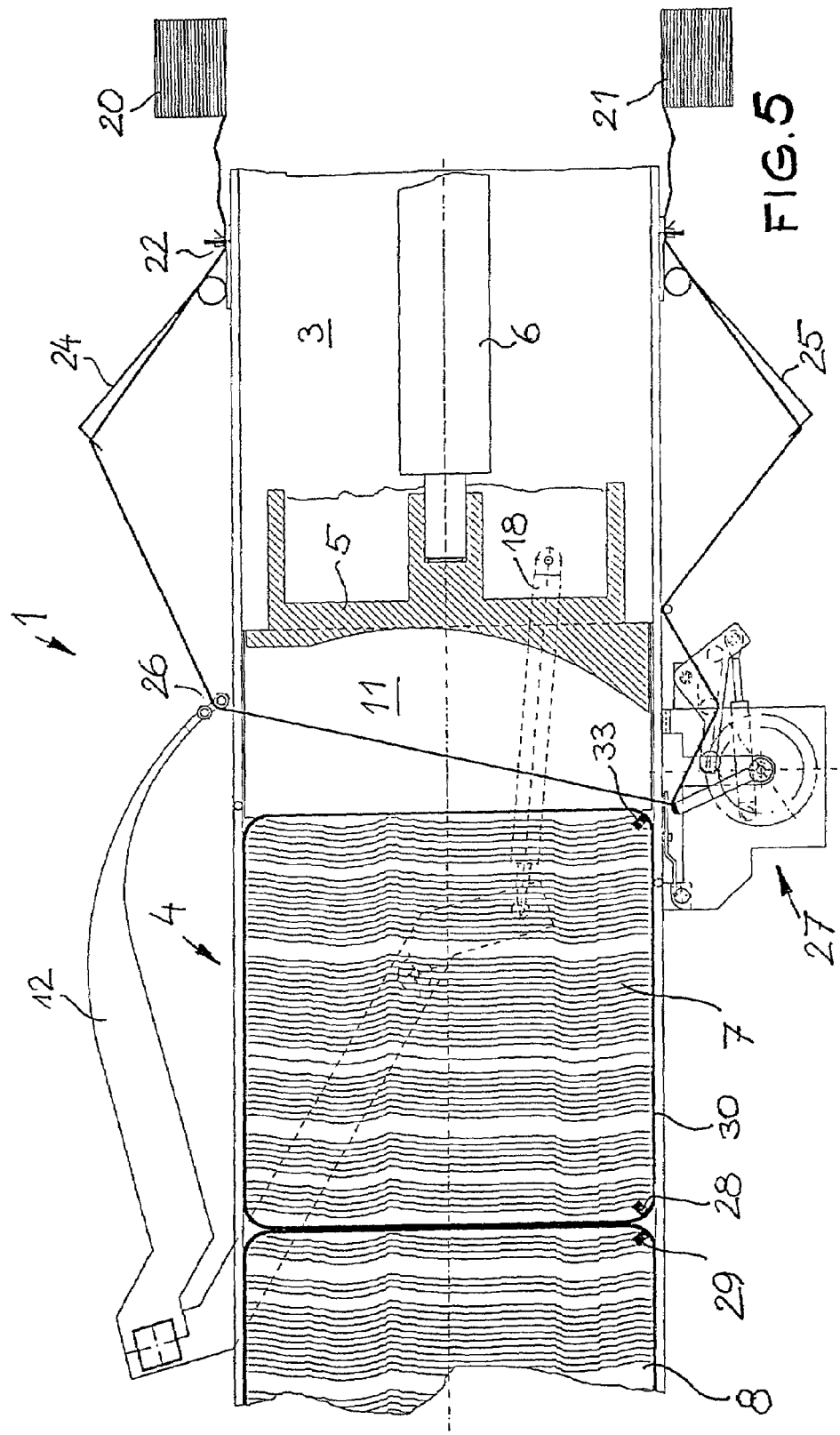

As shown by means of FIG. 4, the two strands 31 and 32 are to be nestled closely together in a region in which the new knot 35 is to be formed. For this purpose, a yarn presser 36, which initially appears in cross view in FIG. 2, swivels about an axis, which extends parallel to the plane of the drawing, and shifts the adjacent end of the strand 31 to the strand 32. However, this contacting movement does not take place in the temporal interplay with the movement of the supplying arm 12 as it does in the case of one of the coupled movements of harvesting machines. Instead, it takes place at a later time. What matters is that the supplying arm 12 as it moves forward through the channel 11, ejects all foreign material that may have entered the channel 11 and also reaches its end position, before the knotting with the contacting movement of the yarn presser 36 is initiated.

The exceedingly complex but known and fully developed movements in the knotter 27 are brought about by a control disk 37 with suitable control cams, which act on a knotter mechanism 38 (not shown in detail), which is provided with appropriate fingers. As a result of these movements, the two strands on the supplying side of the tying yarn are taken hold of and held together, cut off up to the knot region and knotted with one another there.

Figure 6:
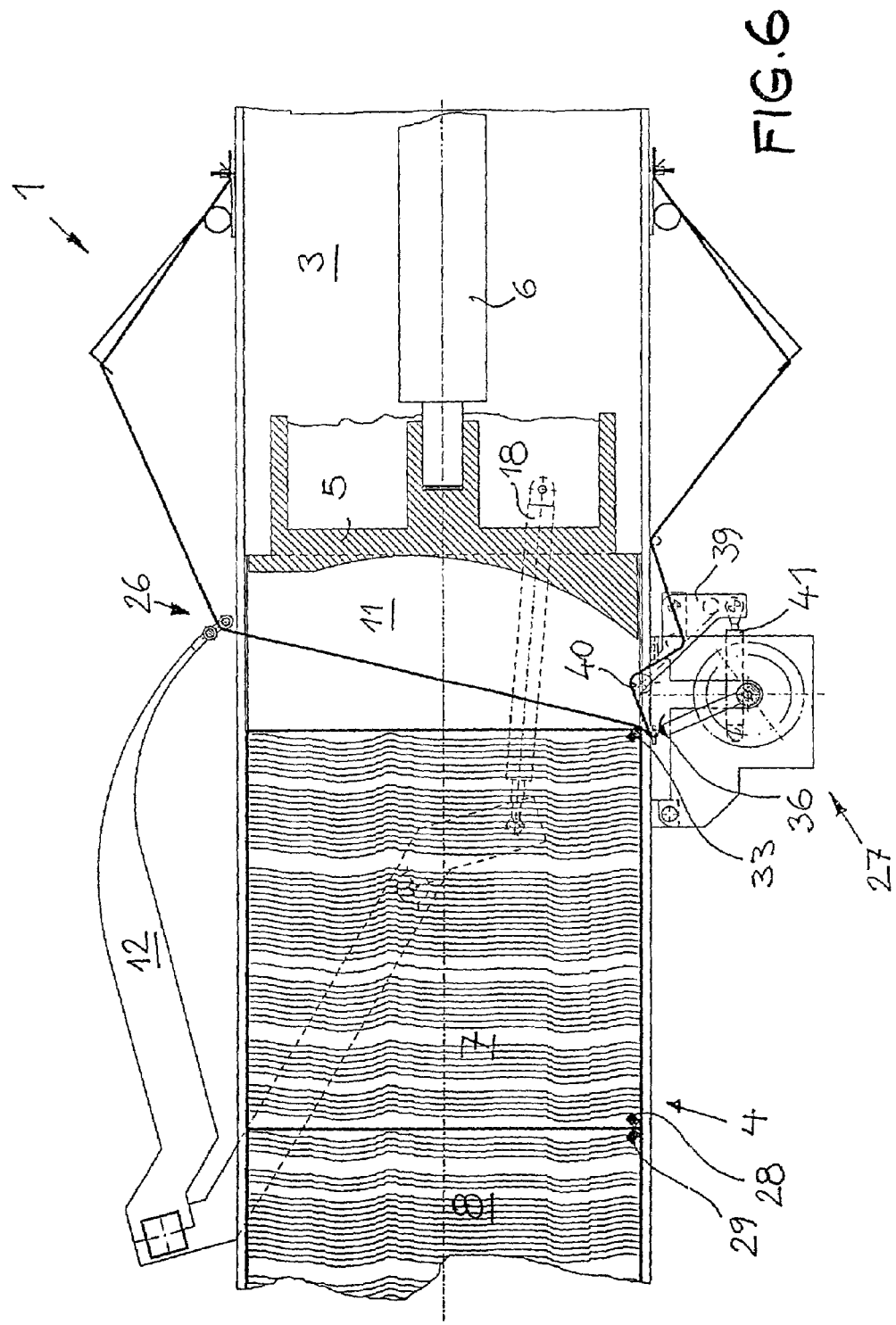

In order to close the free ends of the end yarn, which initially are held together unknotted in the knotter 27, into a new loop, in which these are connected by the second knot 35, the supplying arm 12 initially creates the free movement space of FIG. 6, in that it returns out of the piston 5 into its starting position. For knotting, not only the cut ends of the tying material but also the adjoining regions must be brought closer together, in order to have the tying material approximately parallel for the knotting. For this purpose, a tape rocker 39 at the knotter 27 moves so that the yarn strand, unrolling from roll 21, is pressed with the help of a contacting roller 40 against the yarn strand unrolling from the roll. At the same time, the yarn presser 36 is swivelled along once again with the yarn rocker 39 for the second knot, in order to bring the two ends of the tying yarn together. These movements also are specified independently of time and in a sequence, which is directed to the reliability of the knotting. For this purpose, the yarn rocker 39 is swivelled by an actuator 41, operated by a pressure medium, after the supplying arm 12 has concluded its movement. The later is also actuated independently and moreover the pressure medium actuating drive 18.

An operation with hydraulic actuators is advantageous for converting the harvesting machine tying technique. In this respect, it is advantageous for the coordination and the adaptation of the exceedingly critical press ram region, if the press ram remains stationary and does not carry out a continuous movement about its front dead center, when the supplying arm goes to the knotter, as is customary in the case of harvesting machines. A careful coordination of the piston openings with the movement profile of the supplying arm can be achieved here. At high outputs and high compression forces, it is also important to ensure that the piston remains stationary in its front end position and, at the same time, keeps the finished bale under pressure and does not return back over its dead center position already during the tying process.

However, it has been observed that this technique can be used advantageously in the area of industrial, heavy and stationary hopper bale presses and especially in channel bale presses, if the requirements of the material being pressed, such as waste paper, can take into account the high press forces and the continuous operations by a special configuration of the binding region.

What I claim is:

1. A bale press for loose material, comprising:
   structure defining a filling space for receiving the loose material;
   structure defining a press channel having an inlet open to the filling space;
   a press ram movable through the filling space into the inlet of the press channel for compressing the loose material into a bale, said press ram including channels communicative with outlet slots disposed in a front surface of the press ram;
   knotters for tying a knot in a tying material and for cutting the tying material after the knot, the knotters being disposed next to one another at the inlet of the press channel; and
   supplying arms each being disposed for movement within a respective one of the channels in the press ram, the tying material forming a loop encircling the bale which includes two opposite strands, a one of the two strands being received through a respective one of the outlet slots in the press ram and delivered to an associated one of the knotters where another of the two strands is located by operational movement of a corresponding one of the supplying arms, the two strands which are thereby brought together being knotted together and cut after the knot by the associated one of the knotters.

2. The bale press of claim 1, wherein:
   the press ram is driven by a driving mechanism which is stationary during a supplying movement of the supplying arms; and
   each of the supplying arms is moved essentially in a longitudinal direction thereof through the channels of the press ram.

3. The bale press of claim 2, wherein each of the supplying arms is moved by an arm driving mechanism, the driving mechanism of the press ram and the arm driving mechanism being pressure medium-actuated.

4. The bale press of one of the claims 1 to 3, wherein each of the loops of the tying material has not been knotted and is supplied from a single, one-sided supply of tying material, the free end of the tying material being held in the knotter after being cut.

5. The bale press of one of the claims 1 to 3, wherein the loops each consists of two knotted strands of the tying material which are supplied on each of both sides from a respective tying material supply, the knotter providing the two strands with two knots, between which the two strands are cut.

6. The bale press of one of the claims 1 to 3, wherein the tying material comprises a material without strong and long fibers, which can be dissolved when wet.

7. A bale press for loose material, comprising:
   means defining a filling space for receiving the loose material;
   means defining a pressing channel in which the loose material is baled;
   a press ram movable through said filling space to push loose material in the filling space into said pressing channel to form the loose material into a bale, said press ram including channels and outlet slots in a front surface of said press ram leading to said channels;
   a plurality of knotting devices arranged at an inlet of said pressing channel;
   supply means for supplying a tying material to said knotting devices, each of said knotting devices being arranged to knot first and second strands of the tying material encircling the bale together and cut the first and second strands after the knot; and
   supply arms each carrying a respective one of the first strands and movable in a respective one of said channels of said press ram to thereby carry the first strand from one side of the bale to an opposite side of the bale, each of said channels being formed to accommodate movement of a respective one of said supply arms therethrough.

8. The bale press of claim 7, wherein said knotting devices are arranged next to one another on a common side of said pressing channel.

9. The bale press of claim 7, wherein said press ram includes driving means for moving said press ram through said filling space, said driving means being arranged to be stationary during movement of said supply arms through said channels in said press ram.

10. The bale press of claim 7, wherein said press ram includes a pressure medium-actuated driving mechanism for moving said press ram through said filling space.

11. The bale press of claim 7, further comprising driving means for moving each of said supply arms.

12. The bale press of claim 7, further comprising a pressure medium-actuated driving mechanism for moving each of said supply arms.

13. The bale press of claim 7, wherein each of said supply arms includes a guide through which a respective first strand passes.

14. The bale press of claim 7, wherein said knotting devices are arranged on a first side of said pressing channel and said supply arms are arranged on a second, opposite side of said pressing channel, each of said supply arms being arranged to carry the respective first strand from the first side of said pressing channel through the respective one of said channels in said press ram to said second side of said pressing channel into engagement with a respective one of the second strands.

15. The bale press of claim 14, further comprising guide means arranged on said second side of said pressing channel for guiding the tying material to said knotting devices to form the second strand.

16. The bale press of claim 7, wherein said knotting devices are arranged to retain free ends of the tying material after the first and second strands have been cut after formation of the knot.

17. The bale press of claim 16, wherein said knotting devices are arranged to form an additional knot from the free ends of the tying material.

18. The bale press of claim 7, wherein said supply means comprise rolls of water-soluble tying material.

19. The bale press of claim 7, wherein said supply arms have a sickle shape.

20. The bale press of claim 7, further comprising a lever connected to each of said supply arms and pivotable about an axis to thereby enable a rotational movement of said supply arm about said axis to be obtained during which said supply arm moves through the respective one of said channels in said press ram.

21. The bale press of claim 20, wherein said lever has first arm extending from said axis to a first end of said lever connected to said supply arm and a second arm extending from said axis to a second end of said lever, further comprising a driving mechanism connected to said second end of said lever for pivoting said lever about said axis.

22. The bale press of claim 7, wherein said outlet slots have a width substantially corresponding to a width of said supply arms.

23. The bale press of claim 7, wherein said supply means comprise rolls of single-sided tying material, said knotting devices being arranged to retain free ends of said tying material after the first and second strands have been cut after formation of the knot.

24. The bale press of claim 7, wherein said supply means comprise rolls of tying material arranged on each side of said pressing channel.

25. A bale press for loose material, comprising:
means defining a filling space for receiving loose material;
means defining a pressing channel in which loose material is baled;
a press ram movable through said filling space to push loose material in the filling space into said pressing channel to form the loose material into a bale, said press ram including channels and outlet slots in a front surface of said press ram leading to said channels;
knotting means for forming knots in a tying material and for cutting the tying material;
supply means for supplying the tying material to said knotting means, each of said knotting means being arranged to knot first and second strands of the tying material encircling the bale together and cut the first and second strands after the knot; and
supply arms each carrying a respective one of the first strands and movable in a respective one of said channels in said press ram to thereby carry the first strand from one side of the bale to an opposite side of the bale, each of said channels being formed to accommodate movement of a respective one of said supply arms therethrough.

26. The bale press of claim 25, wherein said knotting means are arranged next to one another on a common side of said pressing channel.

27. The bale press of claim 25, wherein said press ram includes driving means for moving said press ram through said filling space, said driving means being arranged to be stationary during movement of said supply arms through said channels in said press ram.

28. The bale press of claim 25, further comprising driving means for moving each of said supply arms.

29. The bale press of claim 25, wherein each of said supply arms includes guide means through which a respective first strand passes.

30. The bale press of claim 25, wherein said knotting means are arranged on a first side of said pressing channel and said supply arms are arranged on a second, opposite side of said pressing channel, each of said supply arms being arranged to carry the respective first strand from the first side of said pressing channel through the respective one of said channels in said press ram to said second side of said pressing channel into engagement with a respective one of the second strands.

31. The bale press of claim 30, further comprising guide means arranged on said second side of said pressing channel for guiding the tying material to said knotting means to form the second strand.

32. The bale press of claim 25, wherein said knotting means are arranged to hold free ends of the tying material after the first and seconds strands have been cut after formation of the knot.

33. The bale press of claim 32, wherein said knotting means are arranged to form an additional knot from the free ends of the tying material.

34. The bale press of claim 25, wherein said supply means comprise rolls of water-soluble tying material.

35. The bale press of claim 25, wherein said supply arms have a sickle shape.

36. The bale press of claim 25, further comprising rotation means for imparting a rotational movement to said supply arms.

37. The bale press of claim 36, wherein said rotation means comprise a lever connected to each of said supply arms and pivotable about an axis to thereby enable a rotational movement of said supply arm about said axis to be obtained during which said supply arm moves through the respective one of said channels in said press ram.

38. The bale press of claim 37, wherein said lever has first arm extending from said axis to a first end of said lever connected to said supply arm and a second arm extending from said axis to a second end of said lever, further comprising a driving mechanism connected to said second end of said lever for pivoting said lever about said axis.

39. The bale press of claim 25, wherein the tying material is a binding material and said supply means comprise rolls of single-sided binding material, said knotting means being arranged to retain free ends of said binding material after the first and second strands have been cut after formation of the knot.

40. The bale press of claim 25, wherein said supply means comprise rolls of tying material arranged on each side of said pressing channel.

41. A method for baling loose material, comprising the steps of:
guiding a first strand of tying material through a supply arm on a first side of a bale press;
guiding a second strand of tying material along a second side of the bale press;
moving the supply arm through a channel in a press ram to bring the first strand to the second side of the bale press;

knotting the first and second strands on the second side of the bale press to form a first knot and moving the supply arm back through the channel;

placing loose material into a filling space of the bale press;

moving the press ram to force the loose material from the filling space into a pressing channel;

repeating the steps of placing the loose material in the filling space and moving the press ram until a desired compactness of the loose material in the pressing channel is obtained and then stopping movement of the press ram;

moving the supply arm through the channel in the press ram to bring the first strand to the second side of the bale press;

knotting the first and second strands on the second side of the bale press to form a second knot around a completed bale;

moving the supply arm back to the first side of the bale press;

cutting the tying material after the second knot and forming another knot; and repeating the steps of placing loose material into the filling space, moving the press ram, moving the supply arm, knotting the first and second strands and cutting the tying material to form additional bales.

42. The method of claim 41, further comprising the step of maintaining the press ram in a stationary position during movement of the supply arm through the channel in the press ram.

43. The method of claim 41, further comprising the step of forming an outlet slot in a front surface of the press ram in communication with the channel in the press ram.

44. The method of claim 41, further comprising the step of adapting the channel in the press ram to the movement of the supply arm such that the supply arm sweeps the channel during movement through the channel and removes loose material from the channel.

45. A method for baling loose material, comprising the steps of:

providing a press ram with a channel communicative with an outlet slot disposed in a front surface of the press ram, the press ram being movable through a filling space of the bale press and into an inlet of a press channel for compressing the loose material into a bale;

forming a loop of a tying material in the press channel having first and second strands disposed respectively at opposed first and second sides of the press channel;

placing loose material into a filling space of the bale press;

driving the press ram to force the loose material from the filling space into a press channel to form the bale;

transferring the first strand located at the first side of the press channel through the channel in the press ram to the second strand on the second side of the bale press; and knotting the first and second strands together on the second side of the press channel to form a knotted loop encircling the bale.

46. The method of claim 45, wherein said step of transferring includes moving a supplying arm essentially in a longitudinal direction thereof through the channel in the press ram.

47. The method of claim 45, wherein the step of transferring is carried out while maintaining the press ram in a stationary position.

48. The method of claim 46, wherein the supplying arm and the press ram are pressure medium-actuated.

49. The method of claim 45, wherein the tying material is flexible tape.

50. A bale press for loose material, comprising:

structure defining a filling space for receiving the loose material;

structure defining a press channel having an inlet open to the filling space;

a press ram movable through the filling space into the inlet of the press channel for compressing the loose material into a bale, said press ram including channels communicative with outlet slots disposed in a front surface of the press ram;

knotters for tying a knot in a tying material and for cutting the tying material after the knot, the knotters being disposed next to one another at the inlet of the press channel; and supplying arms each being disposed for movement within a respective one of the channels in the press ram, the tying material forming a loop encircling the bale which includes two opposite strands, a one of the two strands being received through a respective one of the outlet slots in the press ram and delivered to an associated one of the knotters where another of the two strands is located by operational movement of a corresponding one of the supplying arms, the two strands which are thereby brought together being knotted together and cut after the knot by the associated one of the knotters, the supplying arms being moved essentially in a longitudinal direction thereof through the channels of the press ram, said press ram being driven by a driving mechanism which is stationary during a supplying movement of the supplying arms, each of the supplying arms being moved by an arm driving mechanism, the driving mechanism of the press ram and the arm driving mechanism being pressure medium-actuated.

* * * * *